UNITED STATES PATENT OFFICE.

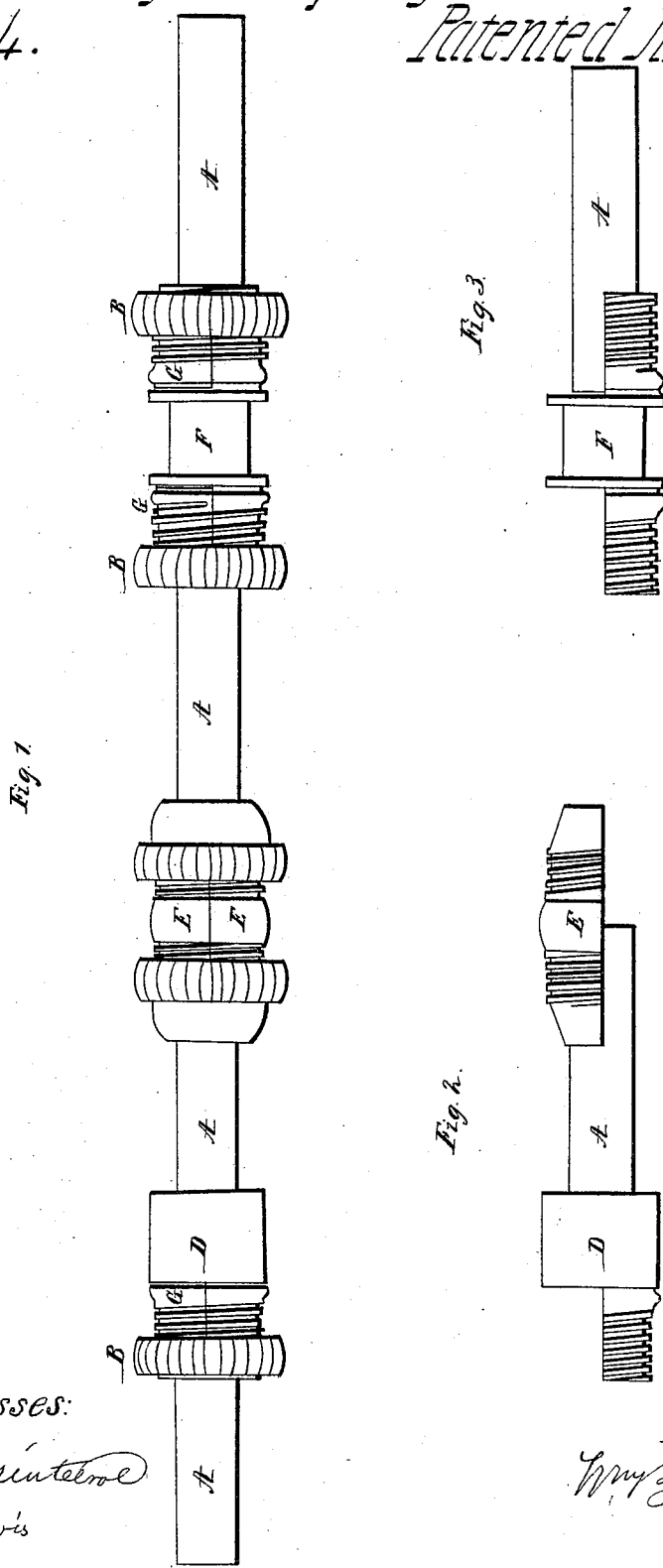

W. B. DUNNING, OF GENEVA, NEW YORK.

COUPLING-BOX FOR SHAFTING.

Specification of Letters Patent No. 20,634, dated June 22, 1858.

*To all whom it may concern:*

Be it known that I, WILLIAM B. DUNNING, of Geneva, in the county of Ontario and State of New York, have invented a new and Improved Coupling-Box; and I do hereby declare that the following is a full, clear, and exact description of the construction and operation of the same, reference being had to the annexed drawing, making part of this specification, in which—

Figure 1, is a view of the coupling-boxes and shaft connected together. Fig. 2, is a view of a shaft with parts of the coupling boxes and the female screw removed. Fig. 3, is a view of a shaft, part of two coupling boxes and bearing or journal with the female screws and part of the coupling box removed.

Like letters of reference refer to similar parts in each figure.

A, in each figure represents the shaft it is made straight and has a groove at each end to receive a tongue that is within the coupling.

B in each part of Fig. 1 is a female screw with the hole tapered and a screw cut to suit the screw on the coupling box these may be made as represented in the model and drawings or square to receive a wrench, or with holes in their peripheries to receive a lever to turn the same with.

C and C′, Fig. 1 are female screws with a cone in each the cones are fitted to the taper of the coupling-box at the end of the same. This taper is represented in Fig. 2. When this taper is used it is not necessary to have any taper in the screws.

D and D Figs. 1 and 2, is a coupling fastened to the shaft at one end, the other end is a half section and screw. This form of coupling-box may be used where the other kinds could not be put together for want of room or space and where one part of the shaft will never require moving or alteration.

E in Figs. 1 and 2 are halves or sections of coupling-box. In Fig. 1 they are fastened together around the shaft by the female screws. In Fig. 2, one of the sections only is represented. All of those represented below the shaft have a tongue fastened within them to hold or prevent them from turning on the shaft; this kind of coupling may be used in any place where the shaft is to be united.

F in Figs. 1 and 3, is a coupling-box and journal or bearing between the couplings. These coupling-boxes may be made like either of the others; this is to be used where the shaft requires support; this prevents wearing the shaft, and when worn untrue it may be taken out and made true and replaced with less labor than the shaft possibly could be.

C, C and C, are sections that may be removed when the screws are parted.

To use my invention put the coupling F Fig. 3 where a support is needed, and the coupling E where the shaft will more frequently require to be taken down to put or take off wheels and if a permanent coupling is required on one end of the shaft use the part D, the part D will be convenient when the shaft is used in a vertical position, this coupling-box is simple and durable and free from danger of bolts or nuts catching belts or any other material that would produce an injury or damage.

Having thus described my invention what I claim and desire to secure by Letters Patent of the United States is—

1. The coupling-box, substantially as and for the purpose specified.

2. The means used for securing the same together as herein described and set forth.

WM. B. DUNNING.

Witnesses:
   E. E. LEWIS,
   GEO. R. DUSENBERRE.